(12) United States Patent
Chen

(10) Patent No.: US 10,338,432 B2
(45) Date of Patent: Jul. 2, 2019

(54) DISPLAY DEVICE

(71) Applicant: InnoLux Corporation, Miao-Li County (TW)

(72) Inventor: Chien-Hung Chen, Miao-Li County (TW)

(73) Assignee: INNOLUX CORPORATION, Miao-Li County (TW)

( * ) Notice: Subject to any disclaimer, the term of this patent is extended or adjusted under 35 U.S.C. 154(b) by 0 days.

(21) Appl. No.: 15/795,517

(22) Filed: Oct. 27, 2017

(65) Prior Publication Data

US 2018/0120634 A1  May 3, 2018

Related U.S. Application Data

(60) Provisional application No. 62/416,679, filed on Nov. 2, 2016.

(30) Foreign Application Priority Data

Apr. 12, 2017  (CN) .......................... 2017 1 0235621

(51) Int. Cl.
| | |
|---|---|
| *G02F 1/1333* | (2006.01) |
| *G02F 1/1335* | (2006.01) |
| *G02F 1/1347* | (2006.01) |
| *F21V 8/00* | (2006.01) |

(52) U.S. Cl.
CPC ....... *G02F 1/133528* (2013.01); *G02B 6/003* (2013.01); *G02B 6/0025* (2013.01); *G02B 6/0051* (2013.01); *G02B 6/0053* (2013.01); *G02F 1/1347* (2013.01); *G02F 1/133305* (2013.01); *G02F 1/133603* (2013.01); *G02F 2001/133531* (2013.01); *G02F 2201/50* (2013.01); *G02F 2202/022* (2013.01)

(58) Field of Classification Search
CPC .... G02B 5/3033; G02B 5/3025; G02B 27/26; Y10T 428/1041; G02F 1/133528; G02F 1/13362; G02F 2001/133541; G02F 1/1347; G02F 1/133603; G02F 1/133305; H01L 51/0097; H01L 2251/5338
See application file for complete search history.

(56) References Cited

U.S. PATENT DOCUMENTS

| | | | | |
|---|---|---|---|---|
| 5,686,979 | A  * | 11/1997 | Weber ........................ | E06B 9/24 349/96 |
| 2009/0147186 | A1 * | 6/2009 | Nakai ................. | G02F 1/13471 349/74 |
| 2010/0259601 | A1 * | 10/2010 | Inoue ..................... | G02B 27/26 348/51 |

(Continued)

*Primary Examiner* — Jia X Pan
(74) *Attorney, Agent, or Firm* — McClure, Qualey & Rodack, LLP

(57) ABSTRACT

A display device includes a backlight structure, a first liquid-crystal layer, a second liquid-crystal layer, and polarized layers. The first liquid-crystal layer is disposed on the backlight structure. The second liquid-crystal layer is disposed on the first liquid-crystal layer. The polarized layers are located between the backlight structure and the first liquid-crystal layer, between the first liquid-crystal layer and the second liquid-crystal layer, and located on the second liquid-crystal layer. The extinction ratio of the polarized layers is in a range from about 5000 to 50000.

17 Claims, 14 Drawing Sheets

(56) References Cited

U.S. PATENT DOCUMENTS

| | | | |
|---|---|---|---|
| 2013/0027622 A1* | 1/2013 | Ishitani | G02F 1/133528 349/42 |
| 2014/0218625 A1* | 8/2014 | Kuromizu | H04N 5/66 348/790 |
| 2015/0108439 A1* | 4/2015 | Kim | H01L 51/5256 257/40 |
| 2015/0205157 A1* | 7/2015 | Sakai | G02F 1/13363 349/62 |
| 2016/0070304 A1* | 3/2016 | Shin | H04M 1/0268 361/679.26 |
| 2018/0113334 A1* | 4/2018 | Fang | G02F 1/13363 |

* cited by examiner

DISPLAY DEVICE

CROSS-REFERENCE TO RELATED APPLICATIONS

This application claims the benefit of U.S. Provisional Application No. 62/416,679 filed on Nov. 2, 2016, the entirety of which is incorporated by reference herein. This application claims priority of China Patent Application No. 201710235621.1 filed on Apr. 12, 2017, the entirety of which is incorporated by reference herein.

BACKGROUND

Field of the Disclosure

The present disclosure relates to a display device, and in particular to a display device with at least three polarized layers.

Description of the Related Art

Conventional liquid-crystal display devices are widely used in various kinds of apparatuses. In general, liquid-crystal display devices include a liquid-crystal structure formed by a polarizer, glass plates for holding transparent electrodes, a liquid-crystal structure, and color filters.

Applying voltage to a liquid-crystal layer changes the orientation or tilt angle of the liquid-crystal molecules in the liquid-crystal layer, which changes the amount of light that can penetrate the picture displayed by the liquid-crystal display device. In order to improve the quality of the liquid-crystal display device, the technology of improving the contrast of the displayed picture of the liquid-crystal display device has been developed.

However, although existing liquid-crystal display devices have been generally adequate for their intended purposes, they have not been entirely satisfactory in all respects. Consequently, it is desirable that a solution for improving the liquid-crystal display devices be provided.

BRIEF SUMMARY

The disclosure provides a display device including a backlight structure, a first liquid-crystal layer, a second liquid-crystal layer, and polarized layers. The first liquid-crystal layer is disposed on the backlight structure. The second liquid-crystal layer is disposed on the first liquid-crystal layer. The polarized layers are located between the backlight structure and the first liquid-crystal layer, between the first liquid-crystal layer and the second liquid-crystal layer, and located on the second liquid-crystal layer. The extinction ratio of the polarizers is in a range from about 5000 to 50000. The polarized layers have an extinction ratio in a range from 5000 to 50000.

BRIEF DESCRIPTION OF THE DRAWINGS

The disclosure can be more fully understood by reading the subsequent detailed description and examples with references made to the accompanying drawings, wherein.

DETAILED DESCRIPTION

Figure 1:
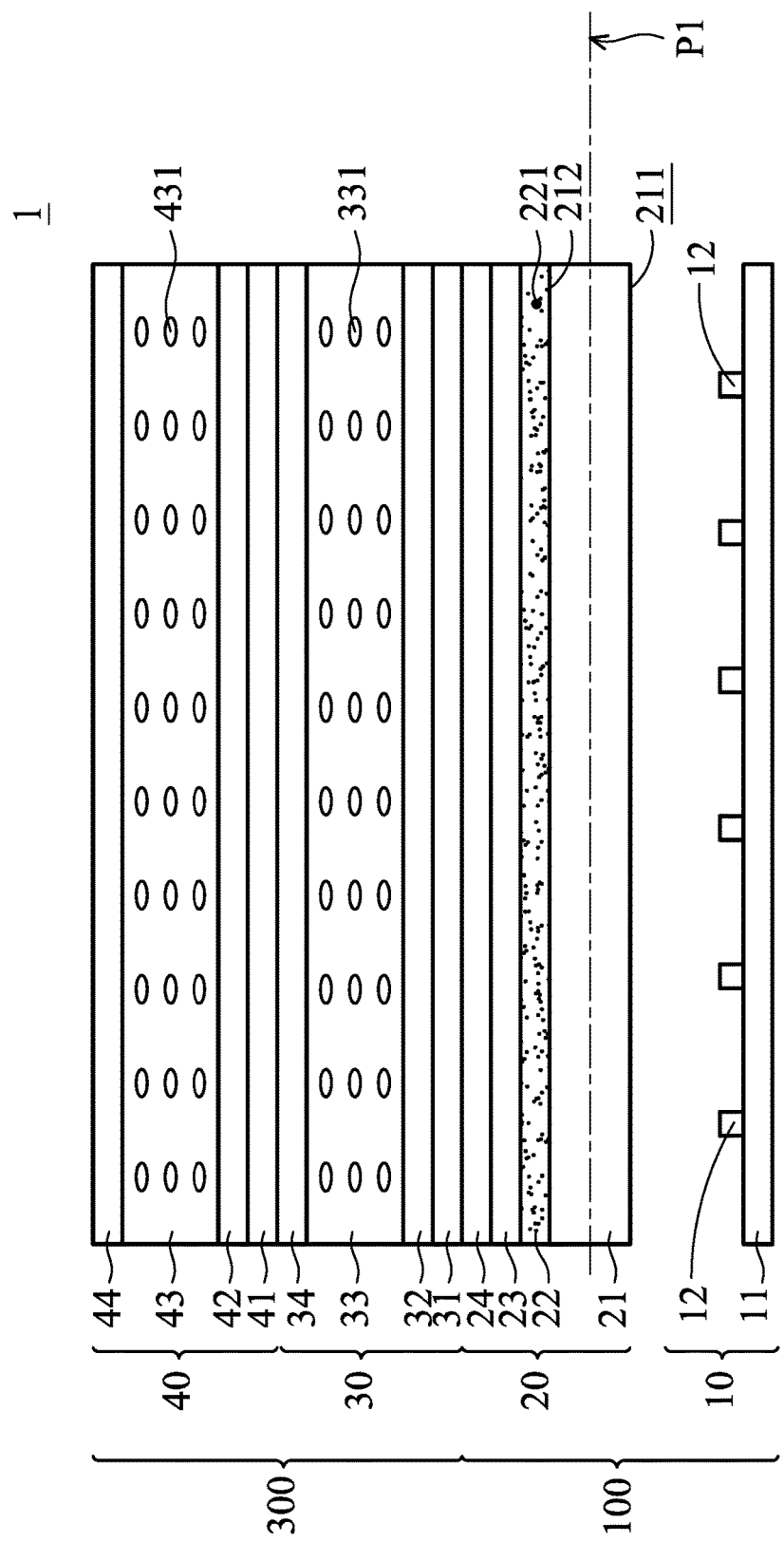
FIG. 1 is a schematic view of a display device in accordance with some embodiments of the disclosure.

The following disclosure provides many different embodiments, or examples, for implementing different features of the present disclosure. Examples of components and arrangements are described below to simplify the present disclosure. For example, the formation of a first feature over or on a second feature in the description that follows may include embodiments in which the first and second features are formed in direct contact, and may also include embodiments in which additional features may be formed between the first and second features such that the first and second features may not be in direct contact.

In addition, the present disclosure may repeat reference numerals and/or letters in the various examples. This repetition is for the purpose of simplicity and clarity and does not in itself dictate a relationship between the various embodiments and/or configurations discussed. The disclosed embodiments may be combined, modified, or replaced in any suitable manner, as long as they do not conflict to each other.

The shape, size, and thickness depicted in the drawings may not be drawn to scale or may be simplified for clarity of discussion; these drawings are merely intended for illustration.

FIG. 1 is a schematic view of a display device 1 in accordance with some embodiments of the disclosure. The display device 1 includes a backlight module 100 and a display panel 300. The backlight module 100 includes a light source 10 and a backlight structure 20. The display panel 300 includes a luminance-adjusting structure 30 and a display structure 40. The light source 10 is configured to emit light beams to the light-guide plate 21. The light source 10 includes a circuit board 11 and light-emitting elements 12. The light-emitting elements 12 are arranged on the circuit board 11. In this embodiment, light-emitting element 12 is arranged on the circuit board 11 in an array.

The backlight structure 20 is disposed on the light source 10, and configured to evenly distribute the light beams generated by the light source 10. In another embodiment, the light source 10 is disposed on the side of the backlight structure 20. The backlight structure 20 includes a light-guide plate 21, a diffusion layer 22, a brightness-enhancement film 23, and a dual-brightness-enhancement film 24. The number of optical films of the backlight structure 20, such as the light-guide plate 21, the diffusion layer 22, the brightness-enhancement film 23, and the dual-brightness-enhancement film 24, can be varied according to the design requirements. For example, the backlight structure 20 may be an edge or a direct backlight structure. In one embodiment of the direct backlight structure 20, the light-guide plate 21 is excluded, and a diffusion layer or a brightness-enhancement film is included, but it is not limited thereto.

The light-guide plate 21 is disposed on the light source 10 or a side of the light source 10. The light-guide plate 21 may be a plate (or sheet) structure, and may extend along a reference plane P1. The shape of the light-guide plate 21 of the disclosure is not limited. The shape of the light-guide plate 21 can be varied since the transmission of the light beam can be guided or changed by the light-guide plate 21. In this embodiment, the reference plane P1 is a flat surface. In some embodiments, the reference plane P1 is a curved surface, but it is not limited thereto. In some embodiments, the reference plane P1 includes at least one flat section and at least one curved section.

The light-guide plate 21 is transparent. In some embodiments, the material of the light-guide plate 21 is acrylic or another plastic, but it is not limited thereto. The light-guide plate 21 is configured to transmit and evenly distribute the light beams generated by the light source 10. In this embodiment, the light-guide plate 21 is included, and thus the reference plane P1 is the same plane as the extension surface of the light-guide plate 21. In other embodiments, the light-guide plate 21 is excluded, and thus the reference plane P1 is the same as the extension surface of one of the optical films, or of the polarized layer.

The light beam generated by the light source 10 enters into the light-guide plate 21, and is reflected or totally reflected in the light-guide plate 21. In this embodiment, the light beam generated by the light source 10 enters into the light-guide plate 21 via an incident surface 211 of the light-guide plate 21, and is emitted from an emitting surface 212 of the light-guide plate 21 to the diffusion layer 22.

In some embodiments, the light-guide plate 21 may be a wedge plate. The light source 10 is disposed on a thicker side of the light-guide plate 21, and emits light beams toward the thinner side of the light-guide plate 21. Moreover, a reflective material can be coated on the bottom of the light-guide plate 21, and is configured to reflect the light beams passing through the bottom of the light-guide plate 21.

The diffusion layer 22 is disposed on the light-guide plate 21, and extends parallel to the reference plane P1. The diffusion layer 22 is configured to diffuse the light beams emitted from the emitting surface 212 of the light-guide plate 21. The diffusion layer 22 includes diffusion particles 221, and the light beam can be refracted, reflected, or scattered by the diffusion particle 221, and thus the effect of diffusion can be achieved. The diffusion particle 221 of the diffusion layer 22 may be excluded, and the diffusion particle 221 diffuses incident light beams by other suitable methods, but it is not limited thereto.

The brightness-enhancement film 23 is disposed on the diffusion layer 22, and extends parallel to the reference plane P1. The brightness-enhancement film 23 is configured to condense the light beams emitted from the diffusion layer 22, so as to increase the luminance of the backlight structure 20. The material of the brightness-enhancement film 23 includes polyester or polycarbonate, but it is not limited thereto. In some embodiments, the brightness-enhancement film 23 includes a number of prismatic columns or semi-circular columns.

The dual-brightness-enhancement Film 24 is disposed on the brightness-enhancement film 23, and extends parallel to the reference plane P1. The dual-brightness-enhancement film 24 may be a multi-layer structure, configured to increase the luminance of the backlight structure 20.

The luminance-adjusting structure 30 is disposed on the backlight structure 20. The luminance-adjusting structure 30 is a plate (or sheet) structure (but it is not limited thereto), extended parallel to the backlight structure 20. The luminance-adjusting structure 30 is configured to block a portion of the light beams generated by the backlight structure 20, or to allow a portion of the light beams of the backlight structure 20 to pass through.

The luminance-adjusting structure 30 includes a polarized layer 31, a first protection film 32, a first liquid-crystal layer 33, and a second protection film 34. In other embodiments, the first protection film 32 and the second protection film 34 are excluded, but it is not limited thereto.

The polarized layer 31 is disposed on the brightness-enhancement film 23, and extends parallel to the reference plane P1. The polarized layer 31 may be a polarizer that is configured to allow the first polarized component of the light beams emitted by the backlight structure 20 to pass through, while blocking the remaining polarized components of the light beams emitted by the backlight structure 20. The material of the polarized layer 31 may be PVA (polyvinyl alcohol) or another plastic material, but it is not limited thereto. The first polarized component may be a P polarized light beam or an S polarized light beam. For example, the first polarized component is a P polarized light beam. In another case, the first polarized component is an S polarized light beam.

The first protection film 32 is disposed on the polarized layer 31, and extends parallel to the reference plane P1. The first protection film 32 is configured to protect the polarized layer 31. The first protection film 32 may be transparent, but it is not limited thereto. In some embodiments, the first protection film 32 may be triacetate cellulose film (TAC film).

The first liquid-crystal layer 33 is disposed on the first protection film 32, and extends parallel to the reference plane P1. The first liquid-crystal layer 33 is configured to change or maintain the polarization direction of the first polarized component. In this embodiment, after the first polarized component emitted by the polarized layer 31 passes through the first liquid-crystal layer 33, the first polarization direction of the first polarized component is changed to a second polarization direction by the first liquid-crystal layer 33. Moreover, the first polarization direction is perpendicular to or substantially perpendicular to the second polarization direction. The first polarization direction being substantially perpendicular to the second polarization direction means that the angle between the first polarization direction and the second polarization direction is in a range from about 85 degrees to 95 degrees.

In this embodiment, the first liquid-crystal layer 33 includes liquid-crystal molecules 331. By applying voltage to the first liquid-crystal layer 33, the orientations of the liquid-crystal molecules 331 can be adjusted. By adjusting the orientations of the liquid-crystal molecules 331 in a number of areas of the first liquid-crystal layer 33, the polarization directions of the first polarized component corresponding to different areas of the first liquid-crystal layer 33 can be changed or maintained.

The second protection film 34 is disposed on the first liquid-crystal layer 33, and extends parallel to the reference plane P1. The second protection film 34 is configured to protect the polarized layer 41. The second protection film 34 may be transparent, but it is not limited thereto. In some embodiments, the material of the second protection film 34 may be the same as the material of the first protection film 32. The second protection film 34 may be triacetate cellulose film (TAC film), but it is not limited thereto. In another embodiment, the first protection film 32 or the second protection film 34 are excluded.

In this embodiment, after the light beam emitted by the backlight structure 20 passes through the polarized layer 31, the first polarized component of the light beam passes through the polarized layer 31, and the remaining polarized components of the light beam are blocked by the polarized layer 31. When the first polarized component is changed to the second polarized component by one area of the first liquid-crystal layer 33, the second polarized component can be emitted to the display structure 40. Therefore, the light beam of the backlight structure 20 can pass through the area to the display structure 40.

Similarly, when the polarization direction of the first polarized component passing through another area of the first liquid-crystal layer 33 is maintained, the first polarized component is blocked by the polarized layer 41 of the display structure 40. Therefore, the light beam of the backlight structure 20 passing through the area cannot pass through the polarized layer 41. Accordingly, by the luminance-adjusting structure 30, the light beam can be provided to different areas of the display structure 40.

The display structure 40 is disposed on the luminance-adjusting structure 30. The display structure 40 may be a plate structure (but it is not limited thereto), and extends parallel to the luminance-adjusting structure 30. The display structure 40 includes a polarized layer 41, a compensation film 42, a second liquid-crystal layer 43, and a polarized layer 44. In this embodiment, the display structure 40 may further include some elements, such as glass substrate, color filters, and alignment film, but not shown in figures for clarity. In other embodiments, the compensation film 42 may be excluded, but it is not limited thereto.

The polarized layer 41 is disposed on the second protection film 34, and extends parallel to the reference plane P1. The polarized layer 41 may be a polarizer, configured to allow the second polarized component of the light beam emitted by the luminance-adjusting structure 30 to pass through, and to block the remaining polarized components of the light beam emitted by the luminance-adjusting structure 30. The material of the polarized layer 41 may be PVA, but it is not limited thereto. The materials of the polarized layer 41 and the polarized layer 31 are the same or different.

The compensation film 42 is disposed on the on the polarized layer 41, and extends parallel to the reference plane P1. The compensation film 42 is configured to improve the angle of visibility or the lack of color shift.

The second liquid-crystal layer 43 is disposed on the compensation film 42, and extends parallel to the reference plane P1. The second liquid-crystal layer 43 is configured to change or maintain the polarization direction of the light beam. In this embodiment, after the second polarized component emitted by the polarized layer 41 passes through the second liquid-crystal layer 43, the second polarized component is changed to the first polarized component.

In this embodiment, the second liquid-crystal layer 43 includes a number of liquid-crystal molecules 431. By applying voltage to the second liquid-crystal layer 43, the orientations, tilt angles or tilt directions of the liquid-crystal molecules 431 can be adjusted. By adjusting the orientations, tilt angles or tilt directions of the liquid-crystal molecules 331 in different areas of the second liquid-crystal layer 43, the polarization directions of light beams corresponding to different areas of the second liquid-crystal layer 43 can be changed or maintained.

The polarized layer 44 is disposed on the second liquid-crystal layer 43, and extends parallel to the reference plane P1. The polarized layer 44 may be a polarizer, configured to allow the first polarized component of the light beam emitted by the second liquid-crystal layer 43 to pass through, and to block the remaining polarized components emitted by the second liquid-crystal layer 43. In this embodiment, the material of the polarized layer 44 may be PVA (bur it is not limited thereto). The material of the polarized layer 44 is the same as or different than the material of the polarized layer 41.

The luminance-adjusting structure 30 and the display structure 40 use the same polarized layer 41. Therefore, in the embodiment of FIG. 1, the display device 1 only includes three polarized layers 31, 41, and 44. After the light beam emitted by the backlight structure 20 passes through the polarized layer 31, the first polarized component of the light beam passes through the polarized layer 31, and the remaining polarized components of the light beam are blocked by the polarized layer 31. The first polarized component is changed to the second polarized component by an area of the first liquid-crystal layer 33, and the second polarized component can pass through the polarized layer 41 to the display structure 40.

In this embodiment, when the light beam emitted by the luminance-adjusting structure 30 passes through the polarized layer 41 and enters into an area of the second liquid-crystal layer 43, the polarization direction of the light beam passing the area of the second liquid-crystal layer 43 is changed, so as to form a first polarized component. Next, the first polarized component can pass through the polarized layer 44, and can be emitted from the display structure 40.

Figure 2A:
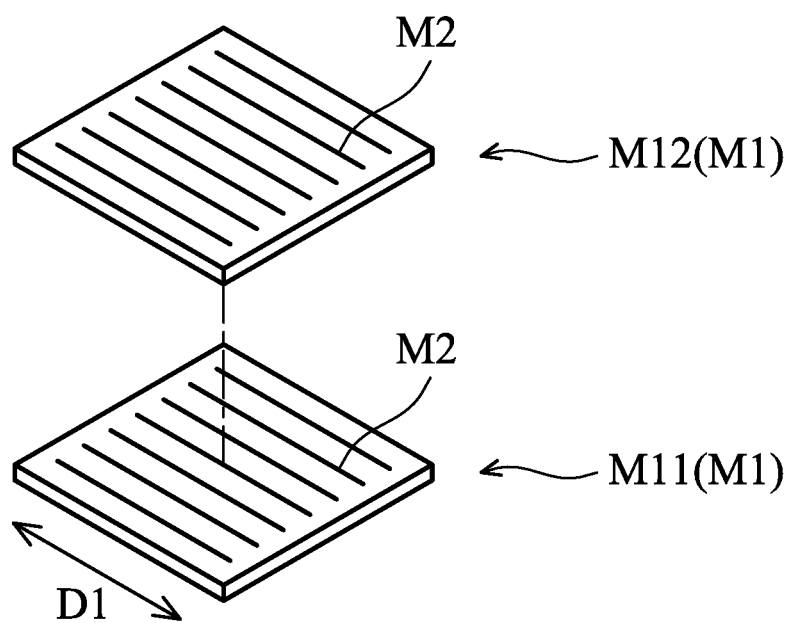
FIG. 2A and FIG. 2B are schematic views of two polarized layers of the disclosure.
Figure 2B:
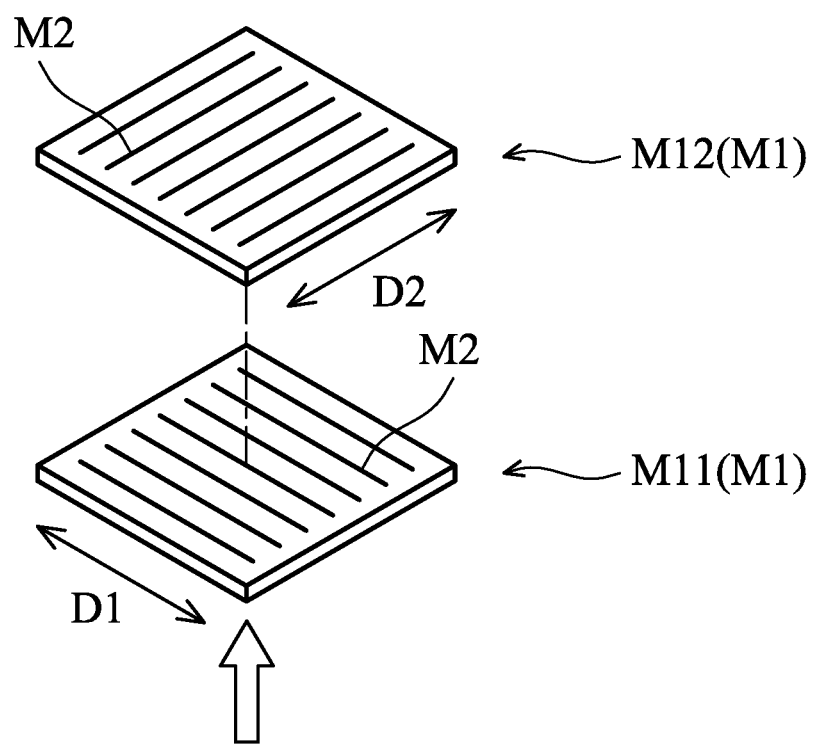

Table 1 is a simulation data table of polarized layers M1 in accordance with the embodiment of FIG. 1. FIG. 2A and FIG. 2B are schematic views of two polarized layers M1 of the disclosure. In FIG. 2A, two adjacent polarized layers M1 with the same structure are illustrated, and the polarization axes M2 of the polarized layers M1 have the same orientation. In FIG. 2B, two adjacent polarized layers M1 with the same structure are illustrated. However, the polarization axes M2 of the polarized layers M1 have different orientations.

Figure 4:
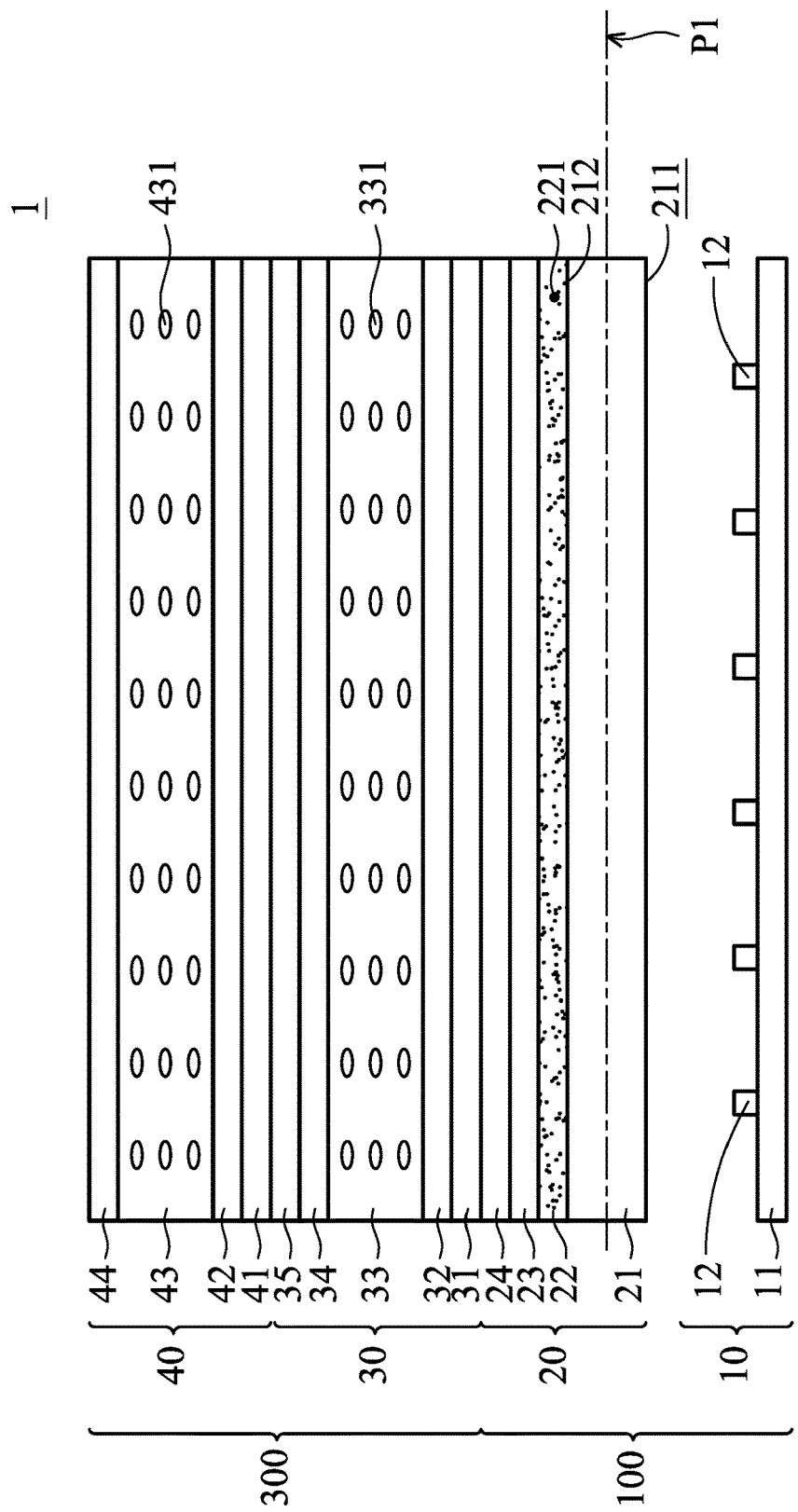
FIG. 4 is a schematic view of the display device in accordance with some embodiments of the disclosure.

The polarized layers M1 are polarized layer 31, polarized layer 35 (as shown in FIG. 4), polarized layer 41 and/or polarized layer 44. In other words, the design of polarized layers M1 can be applied to polarized layer 31, polarized layer 35, polarized layer 41 and/or polarized layer 44.

The embodiments 1 to 7 in table 1 are simulated according to the various designs of the polarized layers M1. According to different materials, thicknesses, and the number of layers, the polarized layers M1 have different Tp values, Ts values, and extinction ratios.

Ts value is defined as the transmittance of the light beam passing through adjacent polarized layers M1 with the polarization axes M2 perpendicular to or substantially perpendicular to each other. A smaller Ts value represents a lower degree of light leakage. Tp value is defined as the transmittance of the light beam passing through adjacent polarized layers M1 with the polarization axes M2 having the same or substantially the same orientations. In this embodiment, the polarization axes M2 perpendicular to or substantially perpendicular to each other is defined as the angle between two polarization axes of two adjacent polarized layers are in a range from about 85 degrees to 95 degrees. The polarization axes M2 having the same or substantially the same orientations is defined as the angle between two polarization axes of two adjacent polarized layers are in a range from about 0 degrees to 5 degrees. A larger Tp value represents a greater transmittance of a polarized layer M1.

The extinction ratio is defined as the Tp value divided by the Ts value. In general, a large extinction ratio may not comply with the design requirements of the display device 1. The extinction ratio is in a range of about 5000 to 50000. When the extinction ratio of the polarized layers M1 is close to 5000, the display device 1 has better luminance. If the extinction ratio is smaller than 5000, the contrast of the display device 1 is poor, and thus it does not meet the quality requirements. When the extinction ratio of two polarized layers M1 is close to 50000, the display device 1 has better contrast. However, if the extinction ratio is greater than 50000, the luminance of the display device 1 is lower, and thus it does not meet the quality requirements. Therefore, the extinction ratio of the polarized layers M1 can be determined according to the design requirements of the product.

Tp values defined by the disclosure include reference Tp values, first Tp values, second Tp values, and third Tp values. Ts values defined by the disclosure include reference Ts values, first Ts values, second Ts values, and third Ts values. The extinction ratios of the disclosure include reference extinction ratios, first extinction ratios, second extinction ratios, and third extinction ratios.

As shown in FIGS. 2A and 2B, each of the polarized layers M1 are stacked and parallel to each other. Moreover, each of the polarized layers M1 can be directly connected to or separated from each other. Moreover, each of the polarized layers M1 includes a number of polarization axes M2. In the disclosure, the polarization axis M2 is a penetrating axis, but it is not limited thereto. The polarization axes M2 are parallel to each other, and extend linearly. In some embodiments, the polarization axis M2 are grooves formed on the surface of the polarized layer M1.

As showing in FIG. 2A, the polarization axes M2 of the polarized layer M11 and the polarization axes M2 of the polarized layer M12 extend along the same first direction D1. Moreover, the polarization axes M2 of the polarized layer M11 and the polarization axes M2 of the polarized layer M12 have the same orientation. In the disclosure, the polarized layers M1 with the same orientations are defined as the polarization axes M2 of the polarized layers M1 extending the same or substantially the same first direction D1. Moreover, the polarized layers M1 with the polarization axes M2 extending along the first direction D1 are arranged in a first orientation arrangement. Moreover, the polarization axes M1 extending the same or substantially the same first direction D1 means that acute angles between the polarization axes are in a range from about 0 degrees to 5 degrees.

TABLE 1

|  | Two polarized layers | | | | Three polarized layers | | |
| --- | --- | --- | --- | --- | --- | --- | --- |
|  | reference Tp value | reference Ts value | reference extinction ratio | Tp ratio | first Tp value | first Ts value | first extinction ratio |
| embodiment 1 | 47.24% | 19.7494% | 2.39 | 116.38% | | | |
| embodiment 2 | 44.17% | 4.27524% | 10.33 | 108.82% | 43.25% | 1.94% | 22.34 |
| embodiment 3 | 43.09% | 0.935836% | 46.05 | 106.16% | 41.90% | 0.376% | 111.46 |
| embodiment 4 | 42.13% | 0.207% | 203.54 | 103.80% | 40.59% | 7.49E−02% | 541.93 |
| embodiment 5 | 41.20% | 0.0465% | 886.05 | 101.51% | 39.32% | 1.50E−02% | 2618.81 |
| embodiment 5-1 | 41.02% | 0.0142544% | 2877.85 | 101.06% | 38.70% | 6.73E−03% | 5754.65 |
| embodiment 6 | 40.59% | 6.42E−03% | 6322.46 | 100.00% | 38.09% | 3.01E−03% | 12643.01 |
| embodiment 7 | 39.74% | 1.30E−03% | 30569.46 | 97.91% | | | |

When a conventional display device is required to have a greater luminance, the reference extinction ratio of the embodiment 6 is a better setting in table 1 for the requirement, wherein the reference extinction ratio of the embodiment 6 is in a range from about 5000 to 50000, and closer to 5000. Moreover, in table 1, Tp ratio takes the reference Tp value of the embodiment 6 as a basis of calculation, and Tp ratio of the embodiment 6 is set to 100.00%. Each Tp ratio is defined as the reference Tp value of each embodiment divided by the reference Tp value of the embodiment 6, and then times 100%.

In the embodiments 1 to 7, the polarized layers M1 processing the simulation experiments include the same materials, and the thicknesses of the polarized layers M1 are different. In the embodiments 1 to 7, the thicknesses of the polarized layers M1 are gradually increased from the embodiments 1 to 7. In other words, the thicknesses of the polarized layers M1 in the embodiment 1 are thinnest, and the thicknesses of the polarized layers M1 in the embodiment 7 are thickest.

In general, the polarized layer M1 with a thicker thickness has a greater cost. In order to save costs, the polarized layer M1 with a thinner thickness is better. Moreover, one having ordinary skill in the art can implement experiments or simulate experiments using suitable polarized layers M1 with different materials and/or thicknesses.

As shown in FIG. 2A, when the light beam passes through the polarized layers M11 and M12 in sequence, the polarized layers M1 allow the first polarized component of the light beam to pass through, and block the remaining polarized components. Alternatively, the polarized layers M1 may allow the second polarized component of the light beam to pass through, and block the remaining polarized components.

The following description is one case, but the disclosure is not limited thereto. In this case, the polarization axes M2 of the polarized layers M1 extend along a first direction D1. The polarized layers M1 allow the first polarized component of the light beam to pass through, and block the polarized components that remain.

In some embodiments, when the polarization axes M2 of the polarized layers M1 extend along a first direction D1, the polarized layers M1 allow the first polarized component of the light beam to pass through, and block the remaining polarized components. Alternatively, when the polarization axes M2 of the polarized layer M1 extend along a second direction D2, the polarized layers M1 may allow the second polarized component of the light beam to pass through, and block any remaining polarized components.

As shown in FIG. 2A, when the light beam passes through the polarized layer M11, the first polarized component of the light beam passes through the polarized layers M11, and polarized components of the light beam that remain are blocked by the polarized layer M11. After the first polarized component passes through the polarized layer M11, the first polarized component continuously passes through the polarized layer M12 since the polarization axes M2 of the polarized layer M12 extend along the first direction D1.

As shown in FIG. 2B, the polarization axes M2 of the polarized layer M11 extends along the first direction D1, and the polarization axes M2 of the polarized layer M12 extends along the second direction D2. Therefore, the orientation of the polarized layer M11 and the polarized layer M12 are different. Moreover, the first direction D1 is perpendicular to or substantially perpendicular to the second direction D2. The first direction D1 substantially perpendicular to the second direction D2 means that the angle between the first direction D1 and the second direction D2 is in a range from about 85 degrees to 95 degrees.

In the disclosure, the polarization axes M2 of the polarized layer M11 extending along the first direction D1 are arranged in a first orientation arrangement. The polarization axes M2 of the polarized layer M12 extending along the second direction D2 is arranged in a second orientation arrangement.

As shown in FIG. 2B, when the light beam passes through the polarized layer M11, the first polarized component of the light beam passes through the polarized layer M11, and the remaining polarized components of the light beam are blocked by the polarized layer M11. After the light beam passes through the polarized layer M11, most of the first polarized component of the light beam is blocked by the polarized layer M12 since the polarization axes M2 of the polarized layer M12 extends along the second direction D2.

Since the conventional display device excludes the luminance-adjusting structure 30, the conventional display device merely includes two polarized layers. According the data of two polarized layers M1 in table 1, the reference Tp values, the reference Ts values, and Tp ratios of the embodiments 1 to 7 are gradually decreased, and the reference extinction ratios are gradually increased.

Figure 3A:
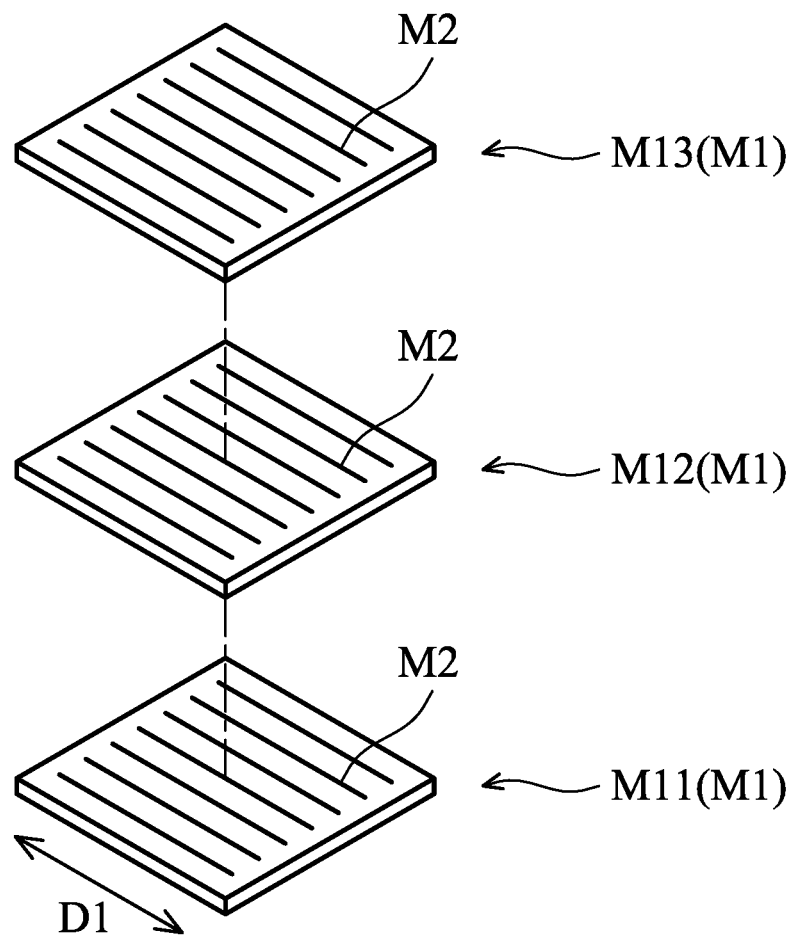
FIG. 3A and FIG. 3B are schematic views of three polarized layers of the disclosure.
Figure 3B:
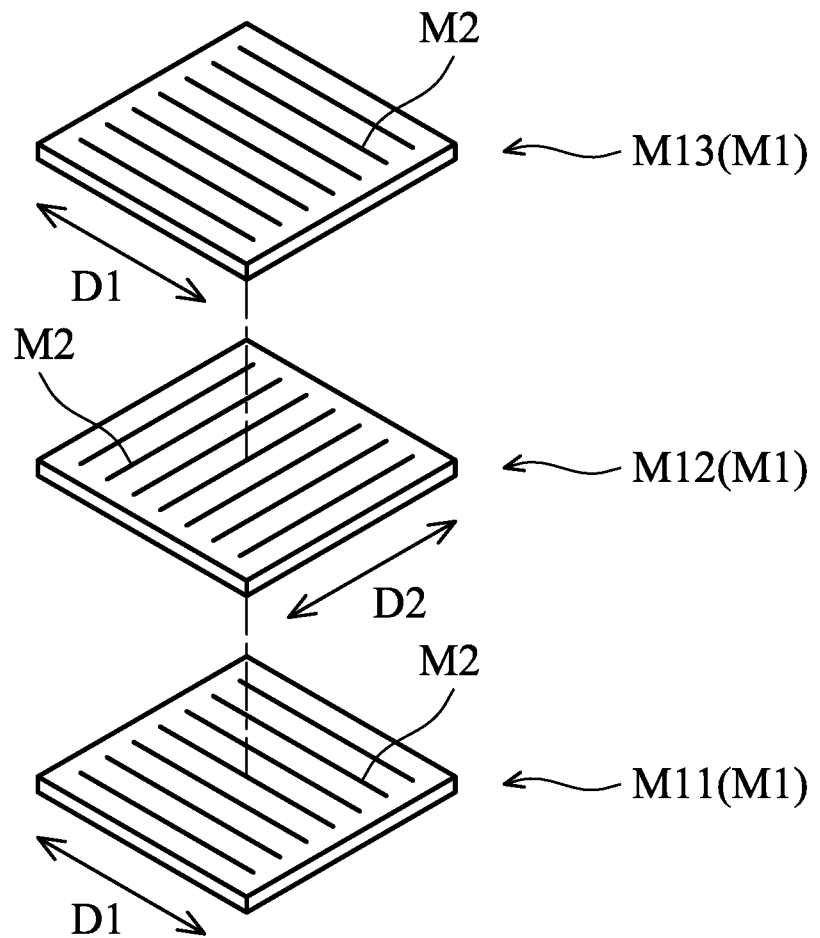

In the embodiment of FIG. 1, the display device 1 includes the luminance-adjusting structure 30 and the display structure 40. Moreover, the display device 1 includes three polarized layers M1. FIG. 3A and FIG. 3B are schematic views of three polarized layers M1 of the disclosure.

As shown in FIG. 3A and FIG. 3B, the polarized layers M1 are stacked and parallel to each other, and the polarized layers M1 can be directly connected to or separated from each other. As shown in FIG. 3A, three polarized layers M1 with the same structure are illustrated. The polarization axes M2 of adjacent polarized layers M1 are arranged in the same orientation arrangement. Three polarized layers M1 with the same structure are illustrated in FIG. 3B. The polarization axes M2 of adjacent polarized layers M1 are arranged in different orientation arrangements. In one embodiment, the orientation arrangement of the polarization axes M2 of at least two polarized layers M1 is different from the orientation arrangement of the polarization axes M2 of one adjacent polarized layer M1.

As shown in FIG. 3A, the polarization axes M2 of the polarized layers M11, M12 and M13 extends along the same first direction D1. Moreover, the orientations of the polarized layer M11, M12, and M13 are the same. When the light beam passes through the polarized layers M11, M12 and M13 in sequence, the polarized layers M11, M12 and M13 allow the first polarized component of the light beam to pass through in sequence, and block the remaining polarized components.

In the disclosure, the light beam passes through three polarized layers M1, and the polarization axes M2 of the polarized layers M1 are arranged in the same or substantially the same orientation arrangement. The transmittance of three polarized layers M1 are defined as first Tp value. A greater first Tp value represents a better transmittance of the polarized layers M1.

As shown in FIG. 3B, the polarization axes M2 of the polarized layers M11 and M13 extend along the first direction D1, and the polarization axes M2 of the polarized layer M12 extend along the second direction D2. Moreover, the orientations of the polarized layers M11 and M13 and the polarized layer M12 are different.

In the disclosure, the light beam passes through three polarized layers M1, and the polarization axes M2 of the polarized layers M1 are arranged in different orientation arrangements, which are perpendicular to each other. The transmittance of three polarized layers M1 is defined as first Ts value. A lower first Ts value represents less light leakage.

In the disclosure, the first extinction ratio is defined as first Tp value divided by first Ts value.

According to the data of the three polarized layers M1 in table 1, the first Tp values and the first Ts values of embodiments 2 to 7 are gradually decreased, and the first extinction ratios are gradually increased. However, a large first extinction ratio may not meet the design requirements of the display device 1. The first extinction ratio is better when the first extinction ratio is in a range from about 5000 to 50000. When the first extinction ratio of three polarized layers M1 is close to 5000, the display device 1 has better luminance. If the first extinction ratio is smaller than 5000, the contrast of the display device 1 is poorer, and thus it does not meet the quality requirements. When the first extinction ratio of three polarized layers M1 is close to 50000, the display device 1 has better contrast. However, if the first extinction ratio is greater than 50000, the luminance of the display device 1 is low, and thus it does not meet the quality requirements.

In this embodiment, the reference extinction ratio does not need to be in a range from about 5000 to 50000. When the first extinction ratio is in a range from about 5000 to 50000, the luminance or the contrast of the display device 1 should meet the design requirements. Therefore, for the purpose of the display device 1 with three polarized layers having better luminance, the first extinction ratio should be close to 5000. According to the data in table 1, by using the polarized layer M1 of the embodiment 5-1 having an reference extinction ratio of 2877.85, the first extinction ratio of three polarized layers M1 can be close to 5000, and thus the display device 1 has better luminance, and the cost of the display device 1 can be decreased, but they are not limited thereto. If the contrast is given priority, the polarized layer M1 having a reference extinction ratio of 6322.46 and a first extinction ratio of 12643.01 can be used in the display device 1. In other embodiments, according to the design of the display device 1, the first extinction ratio of three polarized layers M1 in a range from about 5000 to 50000 can be used in the display device 1.

FIG. 4 is a schematic view of the display device 1 in accordance with some embodiments of the disclosure. In this embodiment, the luminance-adjusting structure 30 further includes a polarized layer 35. The polarized layer 41 of the display structure 40 is disposed on the polarized layer 35.

In the described embodiments, the polarized layers 31, 35, 41 and 44 may have the same thickness, size, material and structure, but it is not limited thereto. By using the same thickness, size, material and structure in polarized layers 31, 35, 41 and 44, the manufacturing cost of the display device 1 can be decreased.

In some embodiments, the polarized layers 31, 35, 41 and 44 include different thicknesses and/or materials.

The polarized layer 35 is disposed on the second protection film 34, and extends parallel to the reference plane P1. The polarized layer 35 is a polarizer, but it is not limited thereto, configured to allow the second polarized component of the light beam to pass through, and to block the first polarized component of the light beam. The material of the polarized layer 35 is PVA, but it is not limited thereto. The material of the polarized layer 35 is the same as or different than the material of the polarized layer 31.

In this embodiment, after the light beam emitted by the backlight structure 20 passes through the polarized layer 31, the first polarized component of the light beam passes through the polarized layer 31, and the remaining polarized components of the light beam are blocked by the polarized layer 31. After the first polarized component is changed to the second polarized component by an area of the first liquid-crystal layer 33, the second polarized component passes through the polarized layer 35 and is emitted to the display structure 40. Therefore, the light beam emitted by the backlight structure 20 can be transmitted to the display structure 40 via the area.

Similarly, when the first polarized component is not changed by another area of the first liquid-crystal layer 33, the first polarized component is blocked by the polarized layer 35. Therefore, the light beam emitted by the backlight structure 20 cannot be emitted to the display structure 40 via the area. By the luminance-adjusting structure 30, the light beam can be provided to different areas of the display structure 40.

Figure 5A:
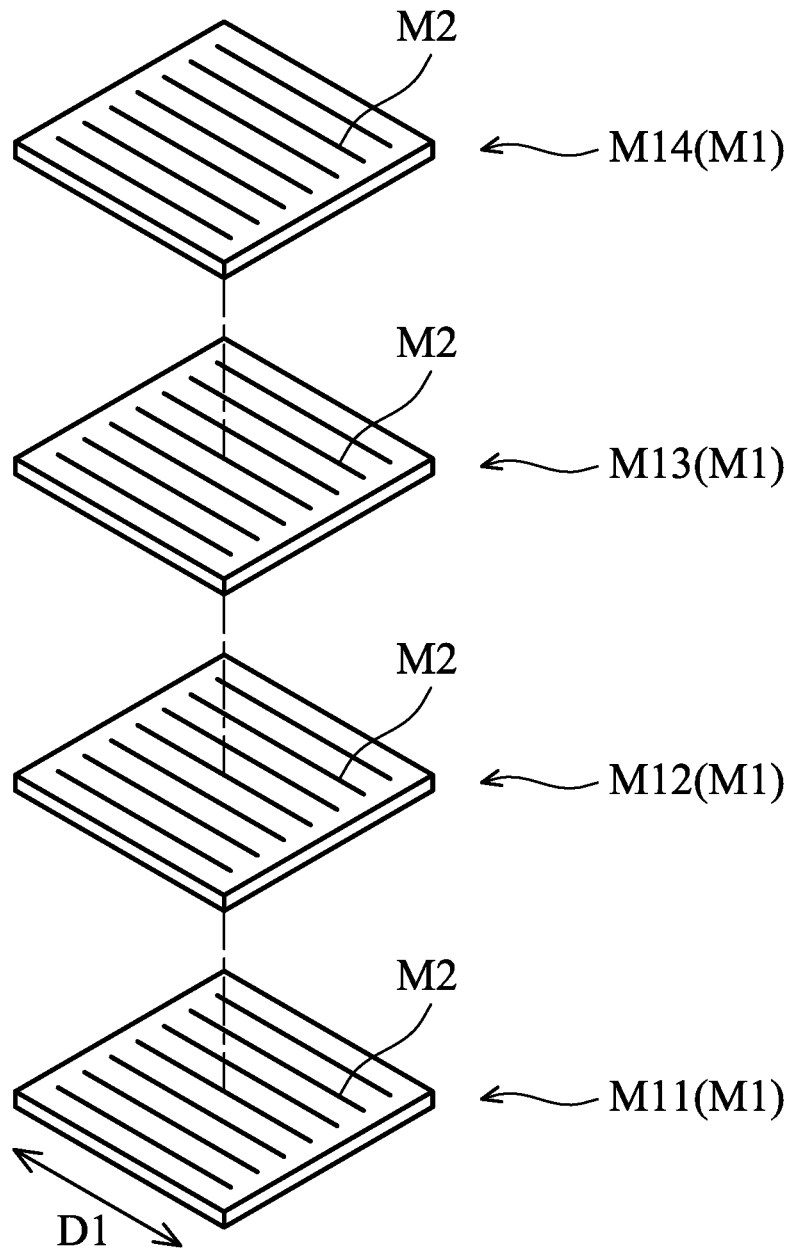
FIG. 5A and FIG. 5B are schematic views of four polarized layers of the disclosure.
Figure 5B:
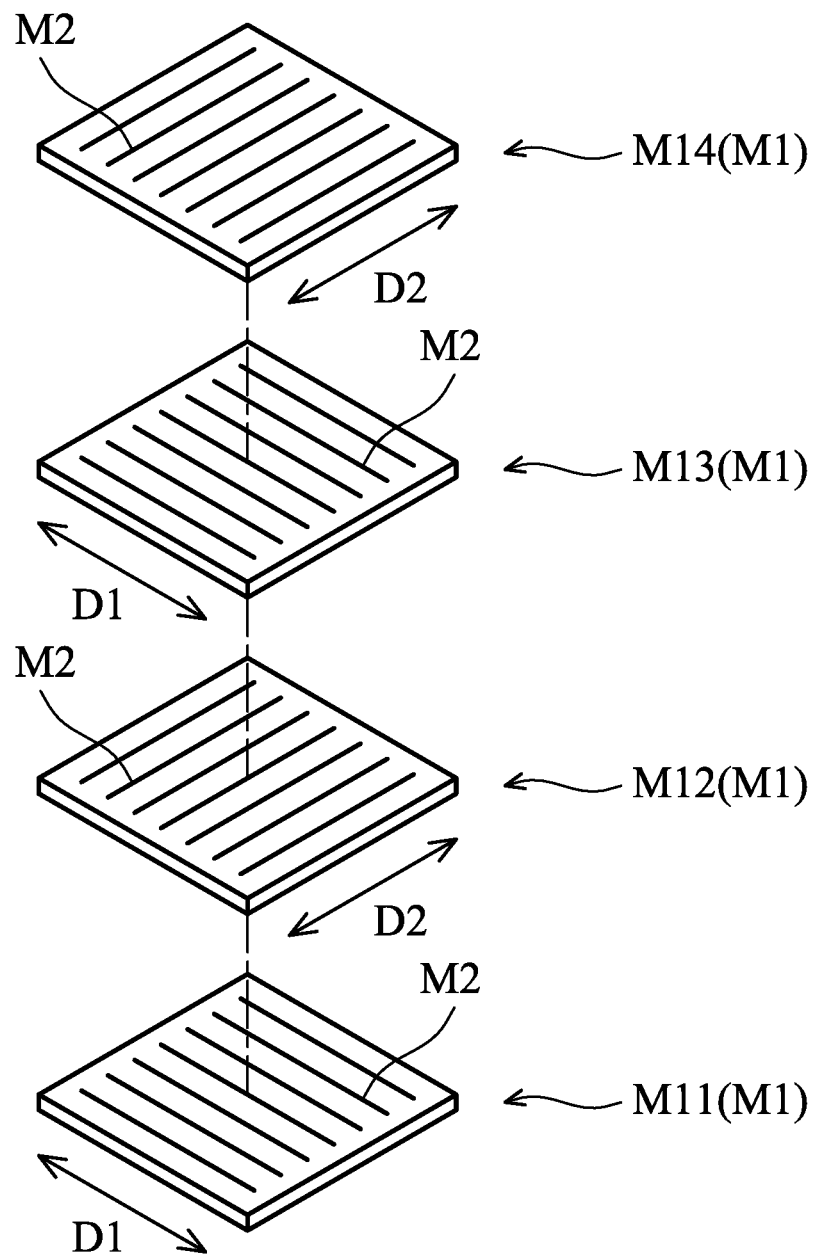

FIG. 5A and FIG. 5B are schematic views of four polarized layers M1 of the disclosure. Table 2 is a simulation data table of the polarized layers M1 according to the embodiment of FIG. 4.

As shown in FIG. 5A and FIG. 5B, the polarized layers M1 are stacked and parallel to each other, and the polarized layers M1 can be directly connected to or separated from each other. As shown in FIG. 5A, four polarized layers M1 with the same structure are illustrated. The polarization axes M2 of adjacent polarized layers M1 are arranged in the same orientation arrangement. Four polarized layers M1 with the same structure are illustrated in FIG. 5B. The polarization axes M2 of adjacent polarized layers M1 are arranged in different orientation arrangements.

As shown in FIG. 5A, the polarization axes M2 of the polarized layer M11, M12, M13 and M14 extend along the same first direction D1. Moreover, the orientations of the polarized layer M11 to M14 are the same or substantially the same. When the light beam passes through the polarized layers M11 to M14 in sequence, the polarized layers M11 to M14 allow the first polarized component of the light beam to pass through in sequence, and block the remaining polarized components.

In the disclosure, the light beam passes through four polarized layers M1, and the polarization axes M2 of the polarized layers M1 are arranged in the same or substantially the same orientation arrangement. The transmittance of four polarized layers M1 is defined as a second Tp value. A greater second Tp value represents a better transmittance of the polarized layers M1.

As shown in FIG. 5B, the polarization axes M2 of the polarized layers M11 and M13 extend along the first direction D1, and the polarization axes M2 of the polarized layers M12 and M14 extend along the second direction D2. Moreover, the orientations of the polarized layers M11 and M13 are different from the orientations of the polarized layers M12 and M14. In one embodiment, the orientation arrangements of the polarization axes M2 of at least two of the polarized layers M1 is different from the orientation arrangement of the polarization axes M2 of an adjacent polarized layer M1.

In the disclosure, the light beam passes through four polarized layers M1, and the polarization axes M2 of the polarized layers M1 are arranged in different orientation arrangements, which are perpendicular to each other. The transmittance of four polarized layers M1 is defined as the second Ts value. A lower second Ts value represents less light leakage.

In the disclosure, the second extinction ratio is defined as the second Tp value divided by second Ts value.

According to the data of the four polarized layers M1 in table 2, second Tp values and second Ts values of embodiments 2 to 7 are gradually decreased, and the second extinction ratios are gradually increased. However, a large second extinction ratio may not meet the design requirements of the display device 1. The second extinction ratio is

TABLE 2

|  | Two polarized layers | | | | Four polarized layers | | |
| --- | --- | --- | --- | --- | --- | --- | --- |
|  | reference Tp value | reference Ts value | reference extinction ratio | Tp ratio | second Tp value | second Ts value | second extinction ratio |
| embodiment 1 | 47.24% | 19.7494% | 2.39 | 116.38% | | | |
| embodiment 2 | 44.17% | 4.27524% | 10.33 | 108.82% | 42.35% | 0.156% | 2.71E+02 |
| embodiment 3 | 43.09% | 0.935836% | 46.05 | 106.16% | 40.59% | 6.42E−03% | 6.32E+03 |
| embodiment 4 | 42.13% | 0.207% | 203.54 | 103.80% | 38.91% | 2.64E−04% | 1.47E+05 |
| embodiment 5 | 41.20% | 0.0465% | 886.05 | 101.51% | 37.30% | 1.09E−05% | 3.43E+06 |
| embodiment 6 | 40.59% | 6.42E−03% | 6322.46 | 100.00% | 35.75% | 4.47E−07% | 7.99E+07 |
| embodiment 7 | 39.74% | 1.30E−03% | 30569.46 | 97.91% | 34.27% | 1.84E−8% | 1.86E+09 | better when the second extinction ratio is in a range from about 5000 to 50000. When the second extinction ratio of four polarized layers M1 is close to 5000, the display device 1 has better luminance. If the second extinction ratio is smaller than 5000, the contrast of the display device 1 is poorer, and thus it does not meet the quality requirements. When the second extinction ratio of four polarized layers M1 is close to 50000, the display device 1 has better contrast. However, if the second extinction ratio is greater than 50000, the luminance of the display device 1 is low, and thus it does not meet the quality requirements.

In this embodiment, the reference extinction ratio does not need to be in a range from about 5000 to 50000. When the second extinction ratio is in a range from about 5000 to 50000, the luminance or the contrast of the display device 1 should meet the design requirements. Therefore, for the purpose of the display device 1 with four polarized layers having better luminance, the polarized layer M1 with the reference extinction ratio in a range from about 5000 to 50000 may not necessarily be used in the display device 1. Instead, polarizers having the reference extinction ratio, of 46.05, can be used in the display device 1, but it is not limited thereto. In other embodiments, according to the design of the display device 1, the second extinction ratio of four polarized layers M1 in a range from about 5000 to 50000 can be used in the display device 1.

Figure 6:
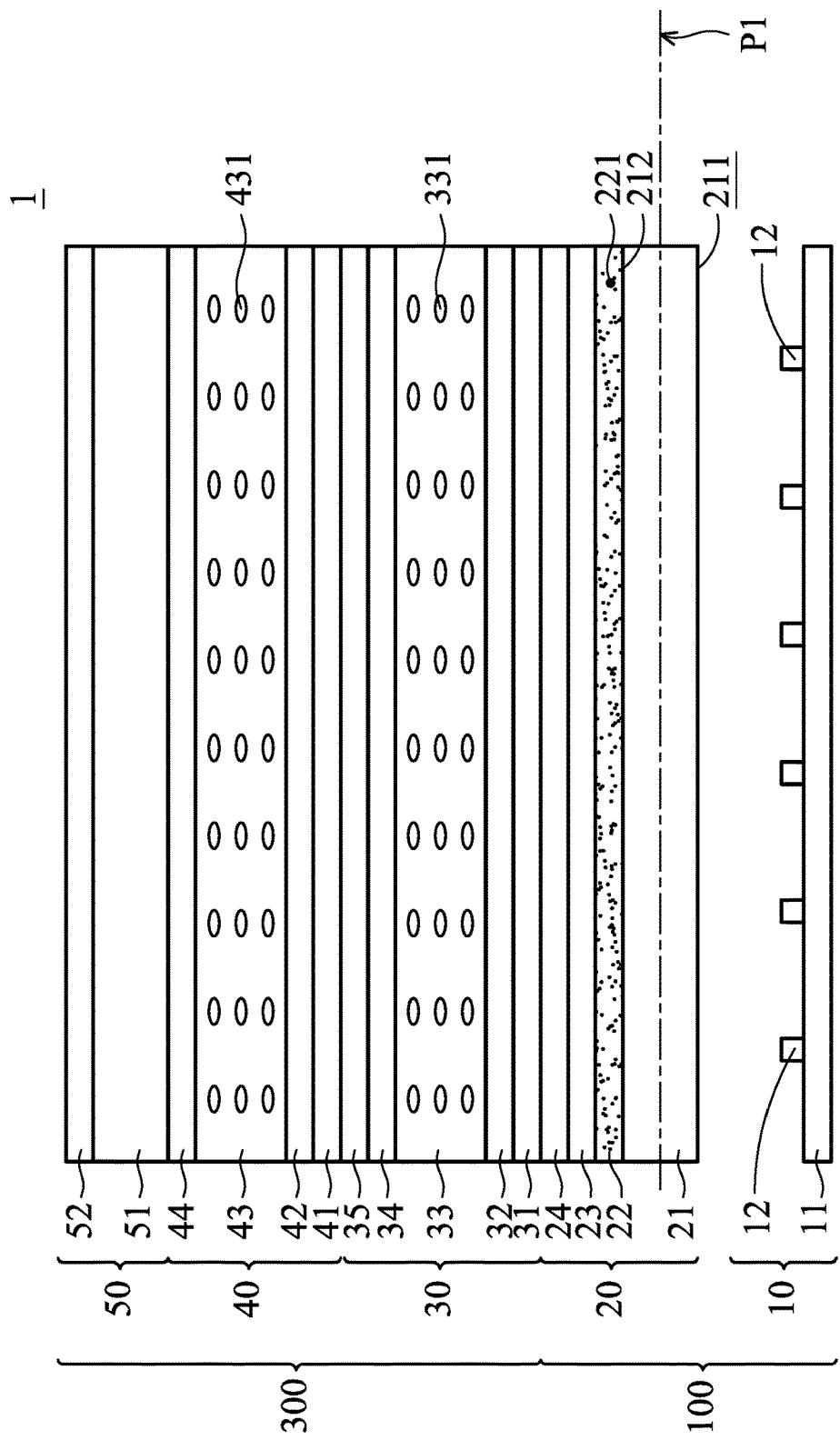
FIG. 6 is a schematic view of the display device in accordance with some embodiments of the disclosure.

FIG. 6 is a schematic view of the display device 1 in accordance with some embodiments of the disclosure. In this embodiment, the display device 1 further includes a protective structure 50. The protective structure 50 is disposed on the display structure 40. The protective structure 50 may be a plate (or sheet) structure (but it is not limited thereto), extending parallel to the display structure 40. The protective structure 50 is configured to protect the display structure 40. In some embodiments, the protective structure 50 provides anti-reflective and touch functionality.

The protective structure 50 includes a protective layer 51 and a polarized layer 52. The protective layer 51 is disposed on the polarized layer 44, and extends parallel to the reference plane P1. The protective layer 51 may be transparent, but it is not limited thereto. In some embodiments, the protective layer 51 may be a glass plate or other scratch or dirt resistant materials for protecting the protective layer 51, such as plastic, but it is not limited thereto. In some embodiments, the protective layer 51 may be a touch protective layer, including touch sensor (not shown in figures) configured to provide touch functionality.

The polarized layer 52 is disposed on the protective structure 50, and extends parallel to the reference plane P1. The polarized layer 52 may be transparent, but it is not limited thereto. The material of the polarized layer 52 is PVA or another plastic material, but it is not limited thereto. The polarized layer 52 allows the first polarized component to pass through, and reflects the second polarized component. Alternatively, the polarized layer 52 may allow the second polarized component to pass through, and reflect the first polarized component.

In the embodiment of FIG. 6, the display device 1 includes a luminance-adjusting structure 30, a display structure 40 and a protective structure 50. The display device 1 includes five polarized layers M1. The polarized layers M1 are polarized layer 31, polarized layer 35, polarized layer 41, polarized layer 44, and/or polarized layer 52.

Figure 7A:
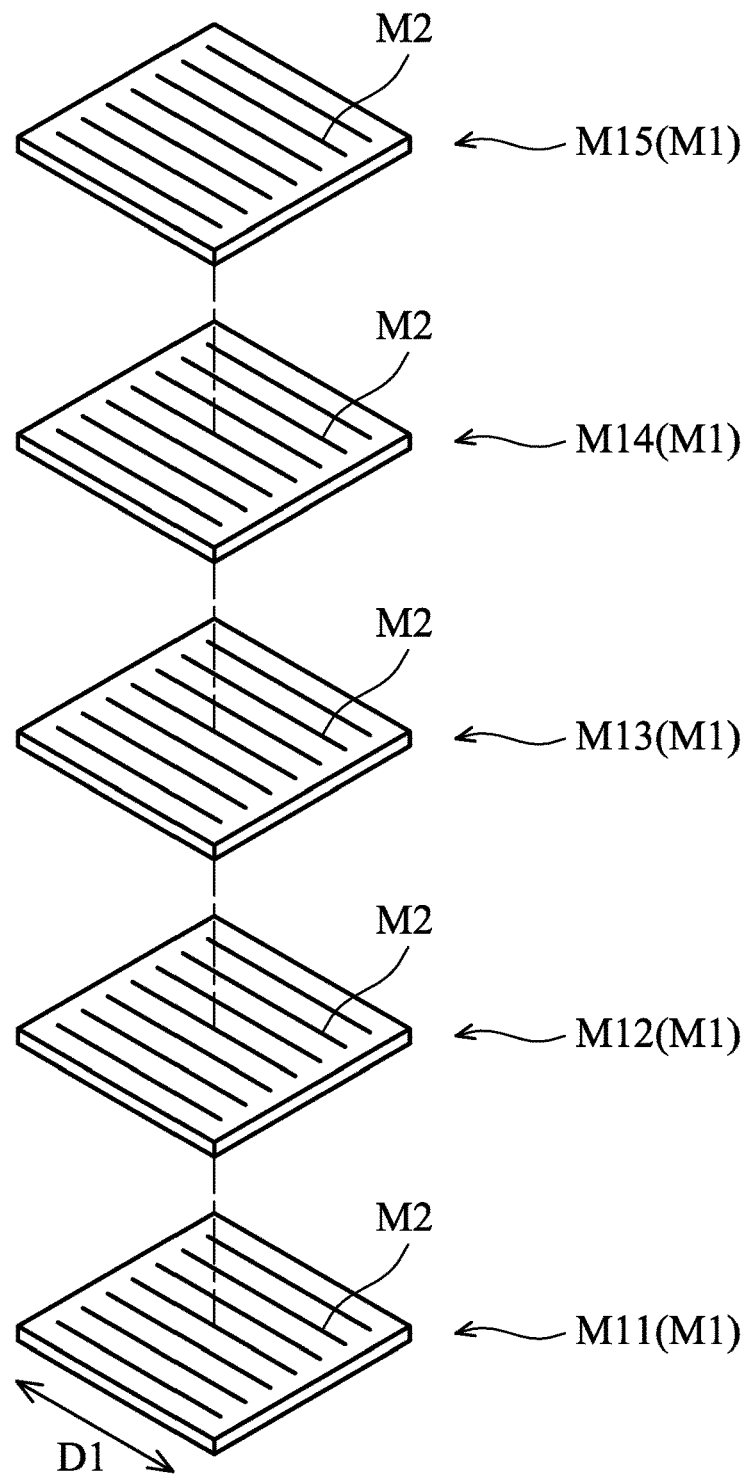
FIG. 7A and FIG. 7B are schematic views of five polarized layers of the disclosure.
Figure 7B:
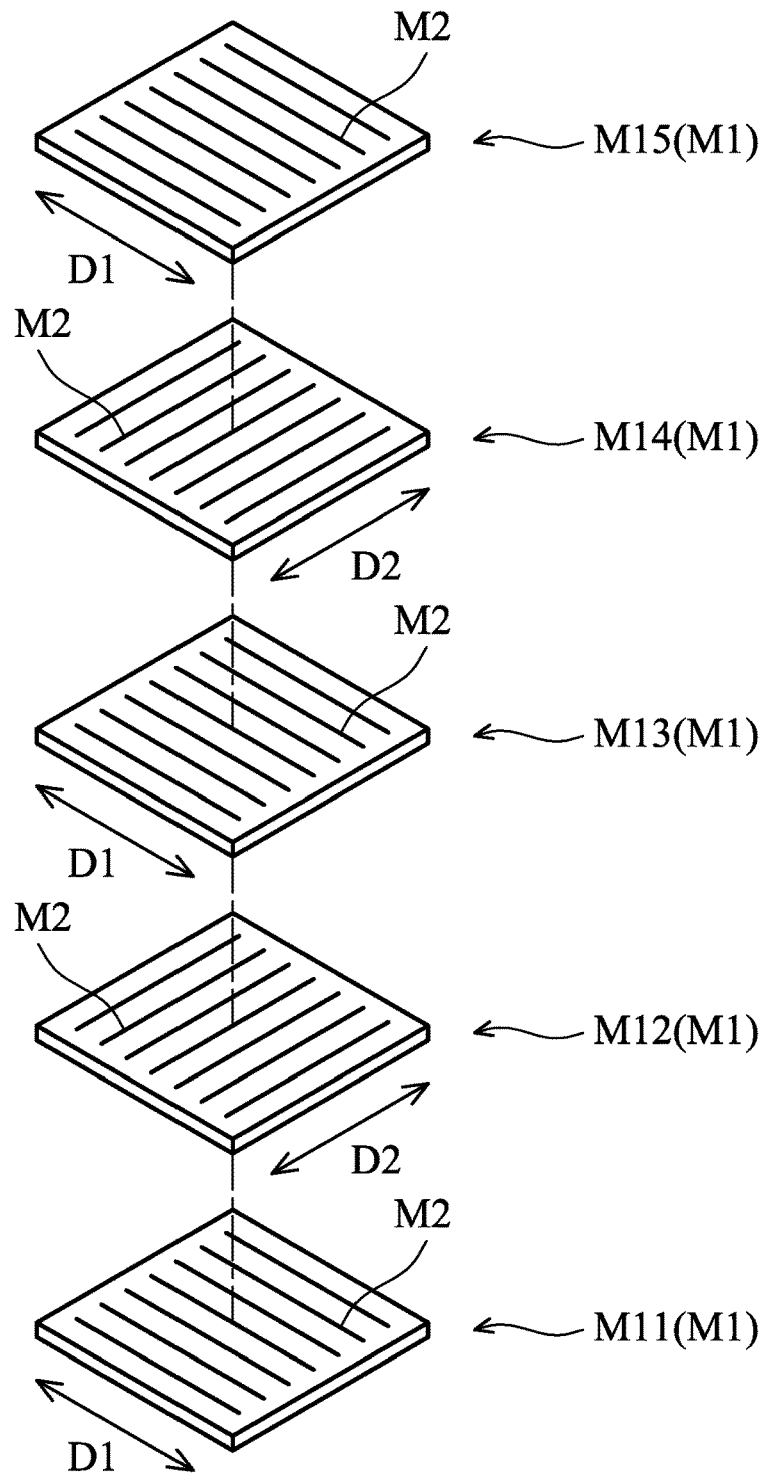

FIG. 7A and FIG. 7B are schematic views of five polarized layers M1 of the disclosure. Table 3 is a simulation data table of the polarized layers M1 according to the embodiment of FIG. 6.

TABLE 3

| | Two polarized layers | | | | Five polarized layers | | |
|---|---|---|---|---|---|---|---|
| | reference Tp value | reference Ts value | reference extinction ratio | Tp ratio | third Tp value | third Ts value | third extinction ratio |
| embodiment 1 | 47.24% | 19.7494% | 2.39 | 116.38% | 43.73% | 2.26% | 1.93E+01 |
| embodiment 2 | 44.17% | 4.27524% | 10.33 | 108.82% | 41.46% | 7.97E−02% | 5.20E+02 |
| embodiment 2-1 | 43.49% | 1.14623% | 37.94 | 107.14% | 39.85% | 7.01E−03% | 5.68E+03 |
| embodiment 3 | 43.09% | 0.935836% | 46.05 | 106.16% | | | |
| embodiment 4 | 42.13% | 0.207% | 203.54 | 103.80% | | | |
| embodiment 5 | 41.20% | 0.0465% | 886.05 | 101.51% | | | |
| embodiment 6 | 40.59% | 6.42E−03% | 6322.46 | 100.00% | | | |
| embodiment 7 | 39.74% | 1.30E−03% | 30569.46 | 97.91% | | | |

As shown in FIG. 7A and FIG. 7B, the polarized layers M1 are stacked and parallel to each other, and the polarized layers M1 can be directly connected to or separated from each other. As shown in FIG. 7A, five polarized layers M1 with the same structure are illustrated and the polarization axes M2 of adjacent polarized layers M1 are arranged in the same orientation arrangement. As shown in FIG. 7B, five polarized layers M1 with the same structure are illustrated and the polarization axes M2 of adjacent polarized layers M1 are arranged in different orientation arrangements. In one embodiment of FIG. 7B, the orientation arrangements of the polarization axes M2 of at least two of the polarized layers M1 is different from the orientation arrangement of the polarization axes M2 of an adjacent polarized layer M1.

As shown in FIG. 7A, the polarization axes M2 of the polarized layer M11, M12, M13, M14 and M15 extend along the same first direction D1. Moreover, the orientations of the polarized layer M11 to M15 are the same or substantially the same. When the light beam passes through the polarized layers M11 to M15 in sequence, the polarized layers M11 to M15 allow the first polarized component of the light beam to pass through in sequence, and block the remaining polarized components.

In the disclosure, the light beam passes through five polarized layers M1, and the polarization axes M2 of the polarized layers M1 are arranged in the same or substantially the same orientation arrangement. The transmittance of five polarized layers M1 are defined as a third Tp value. A greater third Tp value represents a better transmittance of the polarized layers M1.

As shown in FIG. 7B, the polarization axes M2 of the polarized layers M11, M13 and M15 extend along the first direction D1, and the polarization axes M2 of the polarized layers M12 and M14 extend along the second direction D2. Moreover, the orientation of the polarized layers M11, M13 and M15 is different from the orientation of the polarized layers M12 and M14.

In the disclosure, the light beam passes through five polarized layers M1, and the polarization axes M2 of the polarized layers M1 are arranged in different orientation arrangements, which are perpendicular to each other. The transmittance of five polarized layers M1 is defined as the third Ts value. A lower third Ts value represents less light leakage.

In the disclosure, the third extinction ratio is defined as the third Tp value divided by the third Ts value.

According to the data of the five polarized layers M1 in table 3, third Tp values and third Ts values of the embodiments 1 to 2-1 are gradually decreased, and the third extinction ratios are gradually increased. However, a large third extinction ratio may not meet the design requirements of the display device 1. The third extinction ratio is better when the third extinction ratio is in a range from about 5000 to 50000. When the third extinction ratio of five polarized layers M1 is close to 5000, the display device 1 has better luminance. If the third extinction ratio is smaller than 5000, the contrast of the display device 1 is poorer, and thus it does not meet the quality requirements. When the third extinction ratio of five polarized layers M1 is close to 50000, the display device 1 has better contrast. However, if the third extinction ratio of five polarized layers M1 is greater than 50000, the luminance of the display device 1 is low, and thus it does not meet the quality requirements.

In this embodiment, the reference extinction ratio does not need to be in a range from about 5000 to 50000. When the third extinction ratio is in a range from about 5000 to 50000, the luminance or the contrast of the display device 1 should meet the design requirements. Therefore, if the luminance display device 1 is given priority, for the purpose of the display device 1 with five polarized layers having better luminance, the third extinction ratio of five polarized layers M1 should be close to 5000. Accordingly, the polarized layer M1 of the embodiment 2-1 having a reference extinction ratio of 37.94 can be used in display device 1, and the display device 1 has better luminance, and the cost of the display device 1 can be decreased.

When the polarized layers M1 of the disclosure comply with at least one of the ranges of the described parameters, in general, the polarized layers M1 have a better effect and a lower cost.

In some embodiments, each of the polarized layers M1 includes a polarized transmittance. For example, the polarized transmittance is about 90%. In one embodiment, the polarized transmittance is in a range from about 80% to 99%. The polarized transmittance is defined as the transmittance of the first polarized component or the second polarized component passing through a single polarized layer M1. In embodiments 1 to 7 and embodiments 2-1 and 5-1, the polarized layers M1 include different polarized transmittances.

After the polarized transmittance is defined, the extinction ratio is defined by the following formula: (polarized transmittance/2)×(polarized transmittance)^n−1), wherein n is the number of polarized layers M1, n is greater than or equal to 2, and n is a positive integer. When n is 2, the extinction ratio is the reference extinction ratio. When n is 3, the extinction ratio is the first extinction ratio. When n is 4, the extinction ratio is the second extinction ratio. When n is 5, the extinction ratio is the third extinction ratio.

Figure 8:
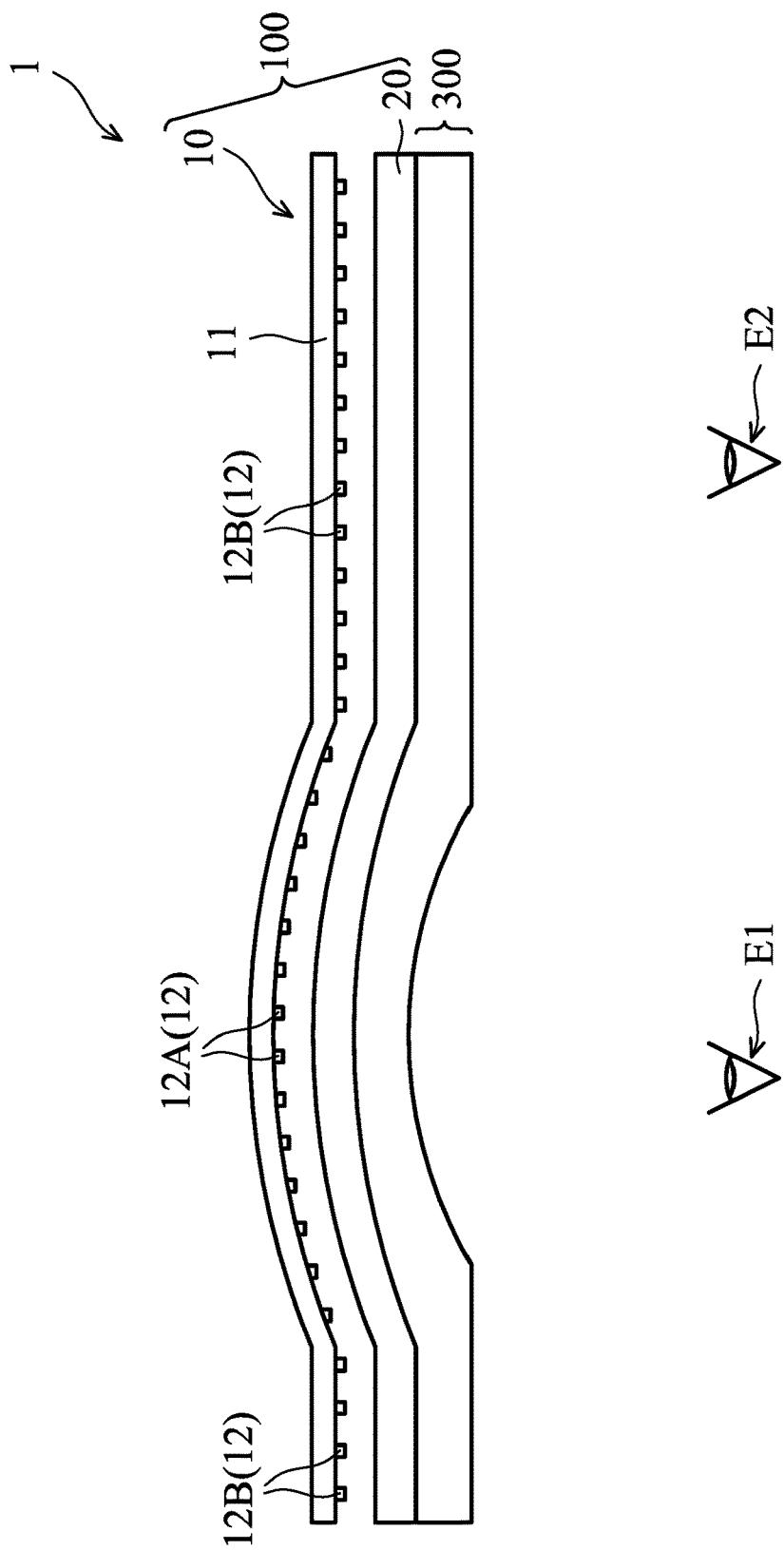
FIG. 8 is a schematic view of the application of a display device of the disclosure.

FIG. 8 is a schematic view of the application of a display device 1 of the disclosure. The display device 1 of the disclosure can be applied to various display devices, advertisement boards, or vehicles. For example, the display device 1 is applied to a vehicle, and the display device 1 includes at least one curved section and at least one flat section. The curved section is configured to display vehicle information such as speed. The flat section is configured to display videos or pictures, but it is not limited thereto. The information displayed on the curved section or the flat section can be switched with each other. The driver of the vehicle may be in front of the curved section, and the passenger of the vehicle may be in front of the flat section. Any described embodiment of the polarized layers M1 can be applied to the display device 1 of this embodiment.

The light-emitting elements 12 include condensation light-emitting elements 12A and/or diffusion light-emitting element 12B. The light-emitting range of the condensation light-emitting element 12A is narrower than the diffusion light-emitting element 12B. The condensation light-emitting element 12A may be disposed in the curved section of the display device 1. The diffusion light-emitting element 12B may be disposed in the flat section of the display device 1. The condensation light-emitting elements 12A and the diffusion light-emitting element 12B can be disposed in the curved section or the flat section of the display device 1 according to the design requirements.

Accordingly, the driver's eye E1 can clearly view the information displayed on the curved section, and also choose to view a video or picture displayed on the flat section. Meanwhile, the eye E2 of the passenger can clearly view the video or picture displayed on the flat section, yet be undisturbed by the vehicle information displayed on the curved section.

Figure 9B:
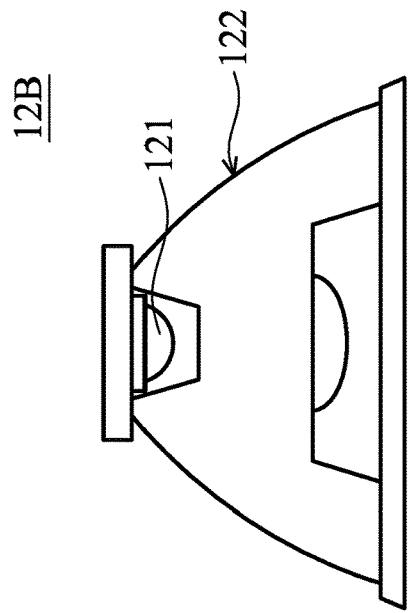
FIG. 9A and FIG. 9B are schematic views of light-emitting elements in accordance with some embodiments of the disclosure.
Figure 9A:
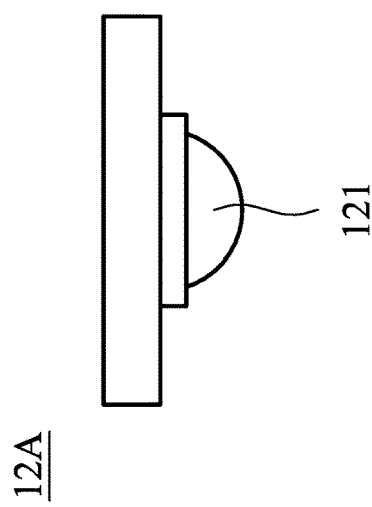

FIG. 9A and FIG. 9B are schematic views of the light-emitting element 12 in accordance with some embodiments of the disclosure. As shown in FIG. 9A, the condensation light-emitting element 12A is a light-emitting diode 121. In this embodiment, the light-emitting diode 121 is a condensation light-emitting diode. As shown in FIG. 9B, the diffusion light-emitting element 12B includes the light-emitting diode 121 and a lens 122. In this embodiment, the light-emitting diode 121 is a condensation light-emitting diode, and the lens 122 is a diffusion lens. Therefore, when the lens 122 is disposed on the light-emitting diode 121, the light-emitting range of the light-emitting diode 121 is broader.

In another embodiment, the diffusion light-emitting element 12B is a light-emitting diode 121, and the light-emitting diode 121 is a diffusion light-emitting diode. The condensation light-emitting element 12A includes a light-emitting diode 121 and a lens 122. The lens 122 of the condensation light-emitting element 12A is a condensation lens. Therefore, the lens 122 is disposed on the light-emitting diode 121, and the light-emitting range of the light-emitting diode 121 is narrowed.

Figure 10B:
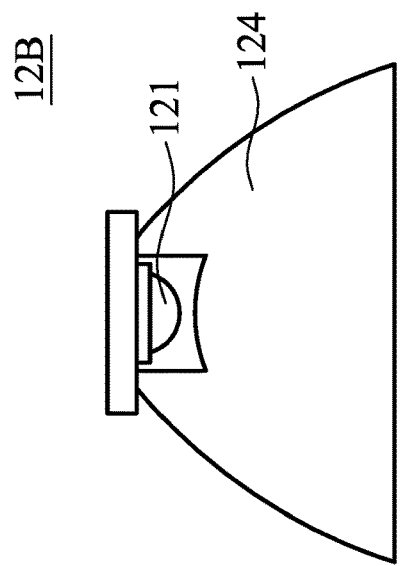
FIG. 10A and FIG. 10B are schematic views of light-emitting elements in accordance with some embodiments of the disclosure.
Figure 10A:
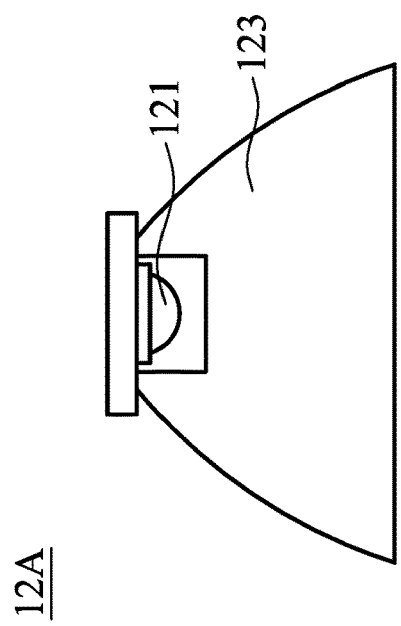

FIG. 10A and FIG. 10B are schematic views of the light-emitting element 12 in accordance with some embodiments of the disclosure. As shown in FIG. 10A, the condensation light-emitting element 12A includes a light-emitting diode 121 and a lens 123. The lens 123 is disposed on the light-emitting diode 121, and is a flat lens. Therefore, when the lens 122 is disposed on the light-emitting diode 121, the light-emitting range of the light-emitting diode 121 is narrowed.

As shown in FIG. 10B, the diffusion light-emitting element 12B includes a light-emitting diode 121 and a lens 124. The light-emitting diodes 121 in FIG. 10A and FIG. 10B have the same structure. The lens 124 is disposed on the light-emitting diode 121, and may be a concave lens. Therefore, when the lens 124 is disposed on the light-emitting diode 121, the light-emitting range of the light-emitting diode 121 is wider. In other embodiments, the lenses 123 and 124 have different design shapes, but they are not limited thereto.

Depending on the structure of the light-emitting element 12, the manufacturing cost of the condensation light-emitting element 12A and the diffusion light-emitting element 12B are reduced.

In conclusion, the display device of the disclosure utilizes the luminance-adjusting structure to adjust the luminance of different areas of the display structure. Moreover, the display device of the disclosure includes at least three polarized layers. Moreover, the luminance and the contrast of the display device meet design requirements, and the manufacturing cost of the display device is reduced.

While the disclosure has been described by way of example and in terms of preferred embodiment, it should be understood that the disclosure is not limited thereto. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A display device, comprising:
    a backlight structure;
    a first liquid-crystal layer disposed on the backlight structure;
    a second liquid-crystal layer disposed on the first liquid-crystal layer;
    a plurality of polarized layers located between the backlight structure and the first liquid-crystal layer, between the first liquid-crystal layer and the second liquid-crystal layer, and on the second liquid-crystal layer;
    a plurality of condensation light-emitting elements disposed under the backlight structure; and
    a plurality of diffusion light-emitting elements disposed under the backlight structure;
    wherein the plurality of polarized layers have an extinction ratio, and the extinction ratio is in a range from 5000 to 50000;
    wherein the display device comprises at least one curved section and at least one flat section, the plurality of condensation light-emitting elements are disposed in the curved section, and the plurality of diffusion light-emitting elements are disposed in the flat section.

2. The display device as claimed in claim 1, wherein the plurality of polarized layers have three polarized layers, the extinction ratio of the three polarized layers is a first extinction ratio, and the first extinction ratio is defined as a first Tp value divided by a first Ts value,
    wherein each of the three polarized layers has a plurality of polarization axes, the first Tp value is defined as a transmittance of a light beam passing through the three polarized layers when the polarization axes are arranged in the same orientation arrangement,
    wherein the first Ts value is defined as a transmittance of a light beam passing through the three polarized layers when the polarization axes are arranged in different orientation arrangements, which are substantially perpendicular to each other.

3. The display device as claimed in claim 1, wherein the plurality of polarized layers have four polarized layers, the extinction ratio of the four polarized layers is a second extinction ratio, and the second extinction ratio is defined as a second Tp value divided by a second Ts value,
    wherein each of the four polarized layers has a plurality of polarization axes, the second Tp value is defined as a transmittance of a light beam passing through the four polarized layers when the polarization axes are arranged in the same orientation arrangement,
    wherein the second Ts value is defined as a transmittance of a light beam passing through the four polarized layers when the polarization axes are arranged in different orientation arrangements, which are substantially perpendicular to each other.

4. The display device as claimed in claim 3, wherein two of the four polarized layers are located between the first liquid-crystal layer and the second liquid-crystal layer.

5. The display device as claimed in claim 1, wherein the plurality of polarized layers have five polarized layers, the extinction ratio of the five polarized layers is a third extinction ratio, and the third extinction ratio is defined as a third Tp value divided by a third Ts value,
    wherein each of the five polarized layers has a plurality of polarization axes, the third Tp value is defined as a transmittance of a light beam passing through the five polarized layers when the polarization axes are arranged in the same orientation arrangement,
    wherein the third Ts value is defined as a transmittance of a light beam passing through the five polarized layers when the polarization axes are arranged in different orientation arrangements, which are substantially perpendicular to each other.

6. The display device as claimed in claim 5, wherein two of the five polarized layers are located between the first liquid-crystal layer and the second liquid-crystal layer, and another two of the five polarized layers are located on the second liquid-crystal layer.

7. The display device as claimed in claim 5, further comprising a protective layer disposed on the second liquid-crystal layer, wherein two of the five polarized layers are located between the first liquid-crystal layer and the second liquid-crystal layer, one of the five polarized layers is located between the second liquid-crystal layer and the protective layer, and the other one of the five polarized layers is located on the protective layer.

8. The display device as claimed in claim 1, wherein the backlight structure further comprises:
    a light-guide plate;
    a diffusion layer disposed on the light-guide plate; and
    a brightness-enhancement film disposed on the diffusion layer,
    wherein the first liquid-crystal layer is disposed on the brightness-enhancement film.

9. The display device as claimed in claim 1, wherein one of the plurality of condensation light-emitting elements is a first condensation light-emitting diode, and one of the plurality of diffusion light-emitting element comprises a second condensation light-emitting diode and a diffusion lens disposed on the second condensation light-emitting diode.

10. The display device as claimed in claim 1, wherein one of the plurality of diffusion light-emitting element is a first diffusion light-emitting diode, and one of the plurality of condensation light-emitting element comprises a second diffusion light-emitting diode and a condensation lens disposed on the second diffusion light-emitting diode.

11. The display device as claimed in claim 1, wherein one of the plurality of condensation light-emitting element comprises a first light-emitting diode and a flat lens disposed on the first light-emitting diode, and one of the plurality of diffusion light-emitting element comprises a second light-emitting diode and a concave lens disposed on the second light-emitting diode,
    wherein the structures of the first light-emitting diode and the second light-emitting diode are the same.

12. The display device as claimed in claim 1, further comprising a compensation film located between the first liquid-crystal layer and the second liquid-crystal layer.

13. The display device as claimed in claim 1, wherein each of the plurality of polarized layers comprises a plurality of polarization axes that are parallel to each other and that extend linearly.

14. The display device as claimed in claim 13, wherein the plurality of polarization axes of at least one of the plurality of polarized layers extend along a first direction, the plurality of polarization axes of remaining the plurality polarized layers extend along a second direction, and the first direction is substantially perpendicular to the second direction.

15. The display device as claimed in claim 1, wherein the polarized layers comprise polyvinyl alcohol.

16. The display device as claimed in claim 1, wherein the backlight structure, the first liquid-crystal layer, the second liquid-crystal layer, and the polarized layers are substantially parallel to each other.

17. A display device, comprising:
- a backlight structure;
- a first liquid-crystal layer disposed on the backlight structure;
- a second liquid-crystal layer disposed on the first liquid-crystal layer;
- a plurality of polarized layers located between the backlight structure and the first liquid-crystal layer, between the first liquid-crystal layer and the second liquid-crystal layer, and on the second liquid-crystal layer;
- a plurality of condensation light-emitting elements disposed under the backlight structure; and
- a plurality of diffusion light-emitting elements disposed under the backlight structure;
- wherein the plurality of polarized layers have an extinction ratio, and the extinction ratio is in a range from 5000 to 50000;
- wherein the display device comprises at least one curved section and at least one flat section, the plurality of diffusion light-emitting elements are disposed in the curved section, and the plurality of condensation light-emitting elements are disposed in the flat section.

* * * * *